US008677402B2

(12) United States Patent
Pedlow et al.

(10) Patent No.: US 8,677,402 B2
(45) Date of Patent: Mar. 18, 2014

(54) SECOND DISPLAY SUPPORT OF CHARACTER SET UNSUPPORTED ON PLAYBACK DEVICE

(75) Inventors: Leo Pedlow, Ramona, CA (US); Ling Jun Wong, Escondido, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 470 days.

(21) Appl. No.: 12/982,483

(22) Filed: Dec. 30, 2010

(65) Prior Publication Data

US 2012/0117587 A1    May 10, 2012

Related U.S. Application Data

(60) Provisional application No. 61/412,306, filed on Nov. 10, 2010.

(51) Int. Cl.
*H04N 5/445* (2011.01)
(52) U.S. Cl.
USPC ............... 725/37; 725/25; 725/28; 725/38
(58) Field of Classification Search
USPC .......................................... 725/25, 28, 37, 38
See application file for complete search history.

(56) References Cited

U.S. PATENT DOCUMENTS

| 5,818,935 | A | * | 10/1998 | Maa | 380/200 |
| 5,870,084 | A | * | 2/1999 | Kanungo et al. | 345/551 |
| 6,545,720 | B1 | * | 4/2003 | Tauzia et al. | 348/468 |
| 8,385,719 | B2 | * | 2/2013 | Shimada | 386/278 |

(Continued)

FOREIGN PATENT DOCUMENTS

WO    2009052650    4/2009

OTHER PUBLICATIONS

Ignacio Mas, Viktor Berggren, Rittwik Jana, John Murray, Christopher V. Rice; "IPTV Session Mobility", Jun. 12, 2009.

*Primary Examiner* — Pankaj Kumar
*Assistant Examiner* — Sahar Baig
(74) *Attorney, Agent, or Firm* — Mayer & Williams PC; Mark D. Wieczorek

(57) ABSTRACT

Systems and methods are provided to allow users to browse services, content items, or the like using the language that is generally most familiar to them, and in particular ones that are not available on an IPTV. Thus, users can browse content offerings on the second display in a language and font set that are personalized to themselves, and they may further send the content item to the IPTV for playback. The disclosed systems and methods provide a way for a group of users to exploit individual "second displays" to view, browse, and navigate content or data service offerings, by service providers, e.g., internet network services, in a preferred language and using preferred fonts, especially one not supported by a content playback device, on behalf of a content playback device, e.g., IPTV, the same having authenticated credentials for playback of such content, and then arrange for a selected content item or items to be played back on the content playback device. The second displays serve as a visual aid to the IPTV, but generally do not require additional investment by the user because the same make use of a device, e.g., a smartphone, laptop computer, tablet computer, an internet appliance, a desktop computer, etc., which most users would already have in their possession. Such a second display is a significant complement to an IPTV because of the second display's strength in supported languages and character font sets, data entry, processing power, and user experience in content management.

32 Claims, 8 Drawing Sheets

(56) References Cited

U.S. PATENT DOCUMENTS

| | | | |
|---|---|---|---|
| 8,522,283 B2* | 8/2013 | Laligand et al. | 725/53 |
| 8,527,261 B2* | 9/2013 | Shibutani | 704/8 |
| 2001/0037510 A1* | 11/2001 | Lee | 725/109 |
| 2006/0041923 A1* | 2/2006 | McQuaide | 725/131 |
| 2006/0149813 A1* | 7/2006 | Janik | 709/203 |
| 2008/0163286 A1* | 7/2008 | Rudolph et al. | 725/28 |
| 2009/0007187 A1 | 1/2009 | Koul | |
| 2009/0210552 A1 | 8/2009 | Ozugur et al. | |
| 2009/0222874 A1 | 9/2009 | White | |
| 2009/0316055 A1* | 12/2009 | Dai | 348/734 |
| 2011/0167468 A1* | 7/2011 | Lee et al. | 725/132 |

* cited by examiner

SECOND DISPLAY SUPPORT OF CHARACTER SET UNSUPPORTED ON PLAYBACK DEVICE

CROSS-REFERENCE TO RELATED APPLICATIONS

This application claims benefit of priority of U.S. Provisional Patent Application No. 61/412,306, filed Nov. 10, 2010, entitled "Support of Foreign Character Set that is not on a Supported Font Set of the IPTV on $2^{nd}$ Display", owned by the assignee of the present invention and herein incorporated by reference in its entirety. Also incorporated by reference in their entireties are co-owned U.S. patent application Ser. No. 12/844,205, filed Jul. 27, 2010, entitled "Control of IPTV Using Second Device", U.S. patent application entitled "Employment of Multiple Second Displays To Control IPTV Content", filed concurrently herewith, U.S. patent application entitled "Device Registration Process From Second Display", filed concurrently herewith, U.S. patent application entitled "Web Browser As Second Display Control Display", filed concurrently herewith, and U.S. patent application entitled "Method and Device To Control IPTV Settings From A Second Display", filed concurrently herewith.

BACKGROUND

Internet delivery of digital content to IPTVs continues to increase, giving rise to an equally challenging issue of content navigation and management. Because of the IPTV's unique situation of being a shared device that is controlled by a simple input device, it is difficult to find an ingenious solution that will resolve this issue without excessively raising hardware costs, especially for users whose native language and familiar character set are not supported by the IPTV. It is impractical to make a remote controller for all possible functions, because the same will significantly increase costs. It is also difficult to navigate around a large IPTV screen, searching for content, without disturbing the viewing experience of other users. Consequently, issues of cumbersome data entry, limitations in memory and processing power, difficulties in effective content searches and the traditional, but limited, one-to-one interaction with the IPTV remain as major obstacles.

In addition, due to memory limitations associated with costs, a limited set of character font sets are available on content playback devices such as IPTVs. The availability of character font sets is usually dependent on the target market of the product. However, as society becomes ever more global, every market is likely to have significant numbers of users who speak and read languages not available on IPTVs.

In addition, yet another limitation of the IPTV is that, at any one time, the same can only display text in a single language.

SUMMARY

Systems and methods according to the principles described here provide a way for users to browse services, content items, or the like using the language that is generally most familiar to them, and in particular ones that are not available on the IPTV. Thus, users can browse content offerings on the second display in a language and font set that are personalized to themselves, and they may further send the content item to the IPTV for playback.

The disclosed systems and methods provide a way for a group of users to exploit individual "second displays" to view, browse, and navigate content or data service offerings, by service providers, e.g., internet network services, in a preferred language and using preferred fonts, especially one not supported by a content playback device, on behalf of a content playback device, e.g., IPTV, the same having authenticated credentials for playback of such content, and then arrange for a selected content item or items to be played back on the content playback device. The user interfaces of the content playback device and the second display can be completely different—so long as the general requirement is met that the second display be enabled to transmit a signal indicating that a user selected a particular content item for playback.

Where multiple content playback devices are provided, an individual content playback device may be selected for content playback and presented content offerings may be customized to that device.

The second displays serve as a visual aid to the IPTV, but generally do not require additional investment by the user because the same make use of a device, e.g., a smartphone, laptop computer, tablet computer, an internet appliance, a desktop computer, etc., which most users would already have in their possession. Such a second display is a significant complement to an IPTV because of the second display's strength in supported languages and character font sets, data entry, processing power, and user experience in content management.

Multiple users using the system and method are enabled to use their personal devices like laptops, tablets, and smartphones to browse and search for content in their own language and character font set, e.g., on content servers operated by service providers, to manage such content and the presentation of authentication credentials therefore, to perform transactions, and to personalize their browsing and searching experience without disturbing the screen of the content playback device and viewing experience of other viewers. Communications with content servers may take place through a proxy server, and the proxy server presents to service providers the authentication credentials of the content playback device, so that the second displays appear to the service providers as an authenticated content playback device. Playback of proprietary content may be arranged to be prohibited on the non-authenticated device, e.g., the second display, so that security risks are minimized (although exceptions to this are described below). The application running on the second display may be a web application (scripting or non-scripting), a native application, a Java application, or any other sort of application that may work with a content playback device. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls.

The second displays may include any device that can run a web application, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

Assuming multiple services are available, the user then selects a service to browse. The service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In one aspect, the invention is directed toward a method of arranging a browsing session for content items for playback on a content playback device, including: establishing a user account session between a second display and a proxy server, the second display further in communication with at least one content playback device, where the establishing a session between a second display and a proxy server includes downloading an application from the proxy server to the second display, the application displaying text in a first language and character font set associated with a profile or with the content playback device; receiving an input from a user, the input indicating a user selection of a second language, the second language having a corresponding character font set; and changing the application to display text in the second language and character font set or, if the second language and character font set is not available, then in a default language and corresponding character font set, the default language and character font set associated with a service provider.

Implementations of the invention may include one or more of the following. The method may further include receiving an input from a user, the input indicating a user selection of a content item from a service provider and causing the content playback device to request the content item from the service provider, where the content playback device requests the content item using an authentication credential, and where the content playback device plays back the content item using the first language and character font set. The method may further include displaying a list of content items on the second display, using the second language and character font set, and where the items on the list are generated at least in part using a device characteristic of the content playback device. The method may further include displaying a list of content items on the second display, using the second language and character font set, where the items on the list are generated at least in part using a list of content playback devices associated with the user account. The items on the list may be generated at least in part using a list of service providers associated with the user account. The method may further include displaying a list of content playback devices associated with the user account, using the second language and character font set, and receiving a selection of which content playback device is to play back a selected content item. The causing the content playback device to request the content item may include causing the second display on which the selection was received to communicate the selection to the content playback device, for the content playback device to request the content item. The causing the content playback device to request the content item may include causing the second display on which the selection was received to communicate the selection to the proxy server on behalf of the content playback device. The receiving a selection of a content item may include receiving a selection of a content item at the proxy server, and the receiving at least a portion of the selected content item may include receiving a content URL at the content playback device. The receiving an input from a user, the input indicating a user selection of a second language, may include determining if a second language has been previously selected by polling a user profile. The changing the application to display text in the second language and character font set or in a default language and character font set may include translating the text. The application may be a web application.

In another aspect, the invention is directed toward a non-transitory computer-readable medium, including instructions for causing a computing device to implement the above method.

In another aspect, the invention is directed toward a computer program, stored on a non-transitory computer-readable medium, for causing a second display to perform the following steps, the second display associated with at least one content playback device. The first step is to establish a session between a second display and a proxy server, the session associated with a user account on the proxy server. The next step is to receive data about at least one content playback device associated with the user account. The next step is to receive an application from the proxy server. The next step is to execute the application, the application displaying text in a first language and character font set associated with the content playback device. The next step is to receive an input from a user, the input indicating a user selection of a second language, the second language having a corresponding character font set. The last step is to change the application to display text in the second language and character font set or, if the second language and character font set is not available, then in a default language and character font set, the default language and character font set associated with a service provider.

Implementations of the invention may include one or more of the following. The second display may be further caused to perform the following additional steps: receive a list of available content items from the proxy server and display the list using the second character font set; and receive a selection of one or more of the available content items; transmit one or more reference identifiers identifying the one or more respective content items to the proxy server, such that the one or more reference identifiers are configured to be employed at the proxy server with an authentication credential of the content playback device to request from one or more respective service providers that the one or more content items be made accessible for playback on the content playback device, whereby such playback occurs using the first language and character font set. A plurality of second displays may be associated with the at least one content playback device, and each second display of the plurality may be configured to display text using a respective user-selected language and character font set. The step of receiving data about at least one content playback device associated with the user account may include: receiving a selection from a user of one or a set of content playback devices associated with the user account, using a default content playback device, or using stored data about previously-used content playback devices. The second display may be selected from the group consisting of: a laptop computer, a tablet computer, a desktop computer, an internet appliance, and a smart phone. The list of available content items may include a list of available service providers. The step of transmitting one or more reference identifiers identifying the one or more respective content items to the proxy server may include transmitting the reference identifiers directly to the content playback device whereby the content playback device transmits a request to a service provider using its authentication credential for the identified content items. The transmitting directly may include transmitting using a transmission scheme including: wired transmissions, wireless transmissions, infrared transmissions, Bluetooth® transmissions, or over a local network. The step of transmitting one or more reference identifiers identifying the one or more respective content items to the proxy server may include transmitting the reference identifiers to the proxy server on behalf of the content playback device. The receiving an input from a user, the input indicating a user selection of a second language, may include determining if a second language has been previously selected by polling a user profile. The changing the application to display text in the second language and character font set or in a default language and character font set may include translating the text.

In another aspect, the invention is directed toward a computer program, stored on a non-transitory computer-readable medium, for causing a proxy server to perform the following steps: receive a request to establish a session with a second display, and upon proper user authentication establish a session with the second display, the session associated with a user account; receive data about at least one content playback device associated with the user account; transmit to the second display an application, the application allowing the second display to browse content offerings of a service provider using the proxy server, the application configured to display text in a first language and character font set associated with the content playback device; receive an input from the second display, the input indicating a user selection of a second language, the second language associated with a second character font set; and transmit a signal to change the application, such that the application displays text in the second language and character font set or, if the second language and character font set is not available, then in a default language and character font set, the default language and character font set associated with the service provider.

Implementations of the invention may include one or more of the following. The second display may be further caused to perform the following additional steps: transmit to the second display a list of available content items, the second display displaying the list of available content items using the second language and character font set or the default language and character font set; receive from the second display a selection of one or more content items for playback; and transmit to the service provider a request for the one or more content items to be made available for playback on the content playback device, the request including an authentication credential of the content playback device, whereby the playback occurs on the content playback device using the first language and character font set. The step of receiving data about at least one content playback device associated with the user account may include: receiving a selection from a user of one or a set of content playback devices associated with the user account, using a default content playback device, or using stored data about previously-used content playback devices. The proxy server may be further caused to perform the steps of: transmit to the second display a list of available service providers; receive from the second display a selection of a first content item from one of the service providers; place the first content item in a queue; receive from the second display a selection of a second content item from another of the service providers; place the second content item in a queue; and upon playback of each queued content item, provide to the respective service provider a service provider credential, the service provider credential associated with the user account and with the selected service provider. The proxy server may be further caused to perform the step of receiving from the second display a selection of one or more content items from the selected service provider for playback, and the step of receiving from the second display a selection of one or more content items for playback may include receiving from the second display one or more respective reference identifiers identifying the one or more respective content items. The transmitted list may be customized based on at least the data about the content playback device. The receiving an input from the second display, the input indicating a user selection of a second language, may include determining if a second language has been previously selected by polling a user profile. The method may further include translating the list of available content items, the second display displaying the list of available content items in the second language and character font set or in the default language and character font set.

Advantages of certain embodiments of the invention may include one or more of the following. Use of a second display affords significant additional features over the case of browsing solely on an IPTV, e.g., browsing may be performed in a language and character font set that is more preferable to a user as compared to the limited character font set and language offerings of content playback devices such as IPTVs. The system and method are not tied to any particular technology—generally, any appropriately-configured second display, that can operate a web browser, may be employed to control any appropriately-configured content playback device, because such second displays generally provide significantly more font sets, providing a superior user experience in browsing service providers. For example, a user can search for content items in their own language, e.g., typing in characters that are not supported on their IPTV. The system may employ on-device service affiliations for premium services such as are available for watching video or other online content, employing the authentication credentials of the IPTV to access premium content while still allowing safe access for browsing by a second display. These service affiliations can include information about a user's preferred browsing language and character font set, or the same may be stored in a general user profile associated with a number of such service affiliations. Where supported character font sets differ among service providers, a user may include in their profile different preferred languages and character font sets, in which case a user may browse one service provider in one language and a different service provider in another. Where needed, and due to the significant user interface capabilities of the second display, multiple languages or character font sets may be displayed at the same time by the second display.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
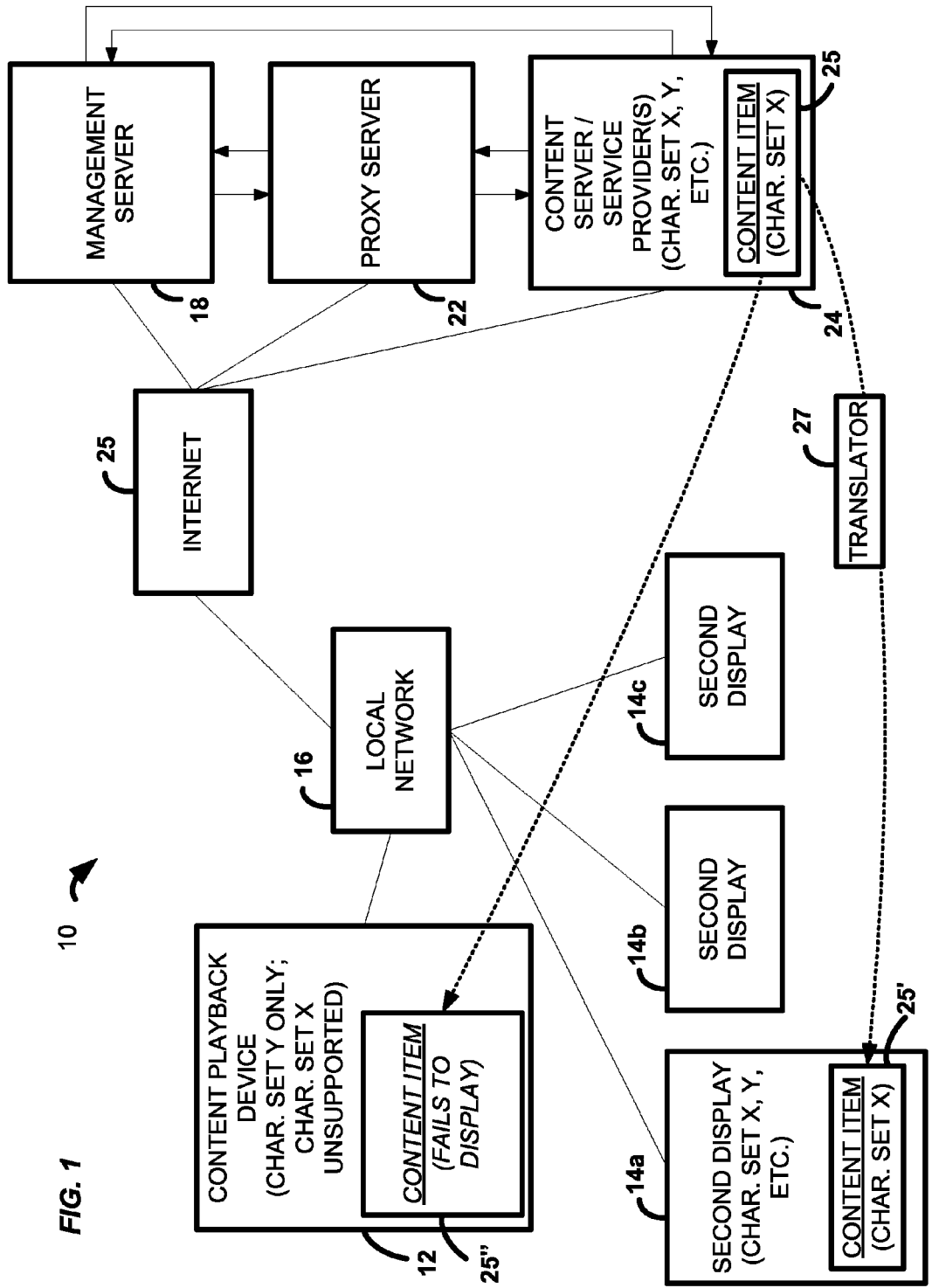
FIG. 1 is a block diagram of an exemplary system in accordance with the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24.

When the second display 14i browses service providers, content offerings, or the like, e.g., information 25 about a content item at service provider 24, it may do so in a language and character font set desired by the user, e.g., character font set X, assuming the service provider 24 supports the character font set X In this way, corresponding information 25' about the content item appears in the desired fashion on a display of second display 14i. The same may include all the information about the content item available at the service provider, or in some cases, e.g., for mobile devices, just a subset of data. This is in contrast to the situation at the content playback device 12. In particular, the content playback device 12 may only support character font set Y, and so attempts to send data for display in character font set X will lead to merely default or erroneous characters (shown as information 25") appearing at content playback device 12. This will generally occur whenever a content provider sends an unsupported character font set for display to a content playback device. In many cases, however, content playback devices will support some character font set and language from most service providers; but the same may not be the character font set and language desired by the user.

As noted above, the second display 14i and the service provider 24 may communicate in a common language and character font set as desired by the user. In some cases, however, the service provider 24 may not support the language desired by the user and employed by the user on the second display 14i. In those cases, a translator 27 may be employed to translate the text to be displayed. The translator 27 may be a module disposed within the local network, within the second display, on the content server, or at any other accessible location on the internet. Even in cases where the translator 27 returns a translation with errors, the same may be very helpful to a user in browsing service providers and content offerings.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet, or between the second display 14i and the internet, may also take place through means besides the local network 16. For example, the second display 14i may communicate with the content playback device 12 through a separate mobile network.

One or more second displays 14a-14c are provided that each bear a processor and components necessary to operate a web application, e.g., a browser application. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here will include a web application, but it will be understood that other types of applications may also be employed. The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
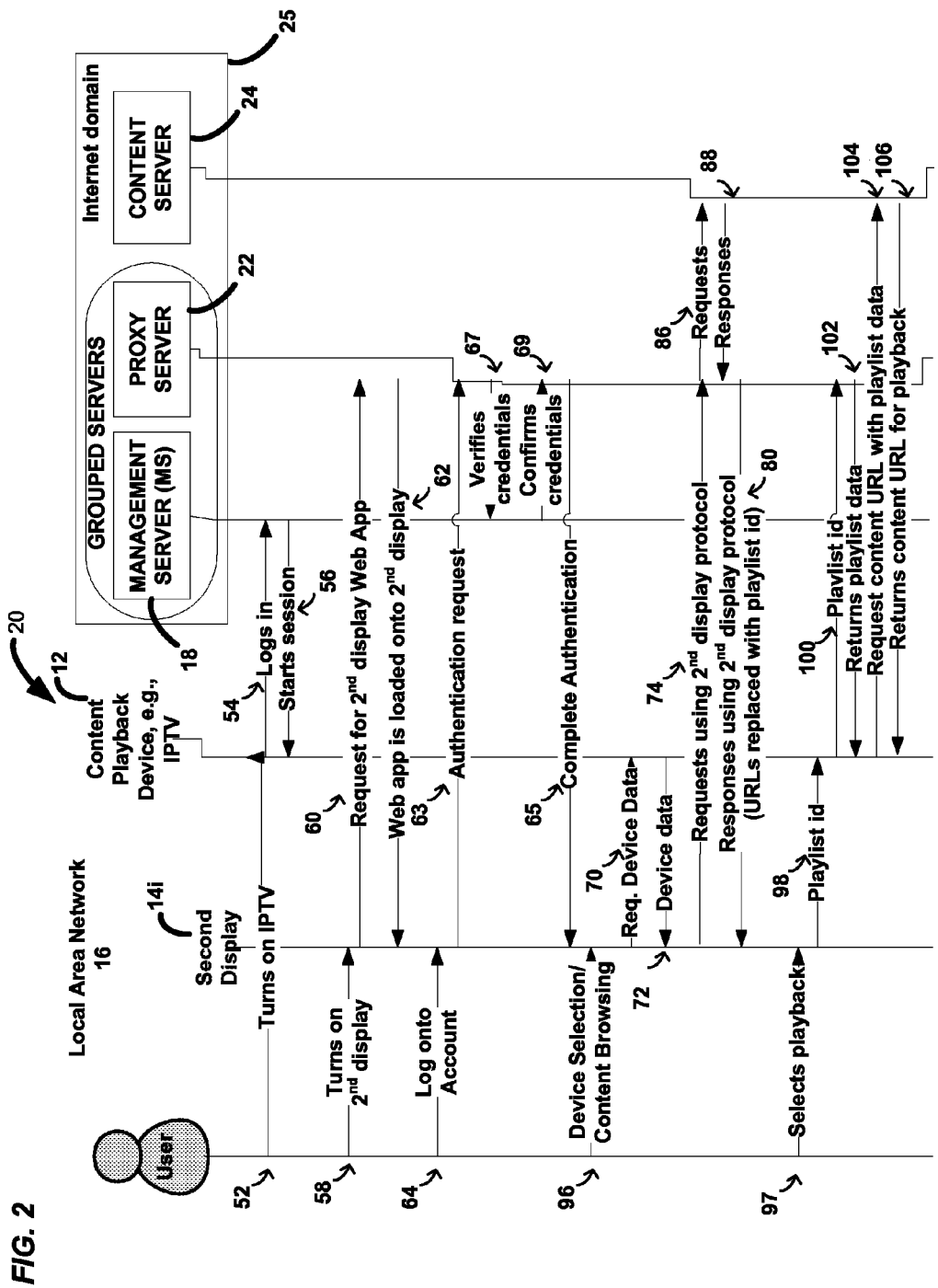
FIG. 2 is a sequence diagram illustrating the system and method according to the present principles.

FIG. 2 is a sequence diagram illustrating an exemplary implementation of the system and method for enabling a user to employ a second display to browse content playback devices, service providers, content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and, e.g., instantiates a web browser session in which control may be exercised over the content playback device. A utility is executed on the second display 14i, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14i and content playback device 12 are on the same local network.

Each second display 14i may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14*i*. That is, the proxy server 22 provides an API for the second display to use so that the content and/or content URL cannot be accessed directly, i.e., the details of the management server transactions to access the services remain desiredly unknown. In many cases, the second display 14*i* may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in Sony Infrared Remote Control System (SIRCS) protocol.

Figure 3:
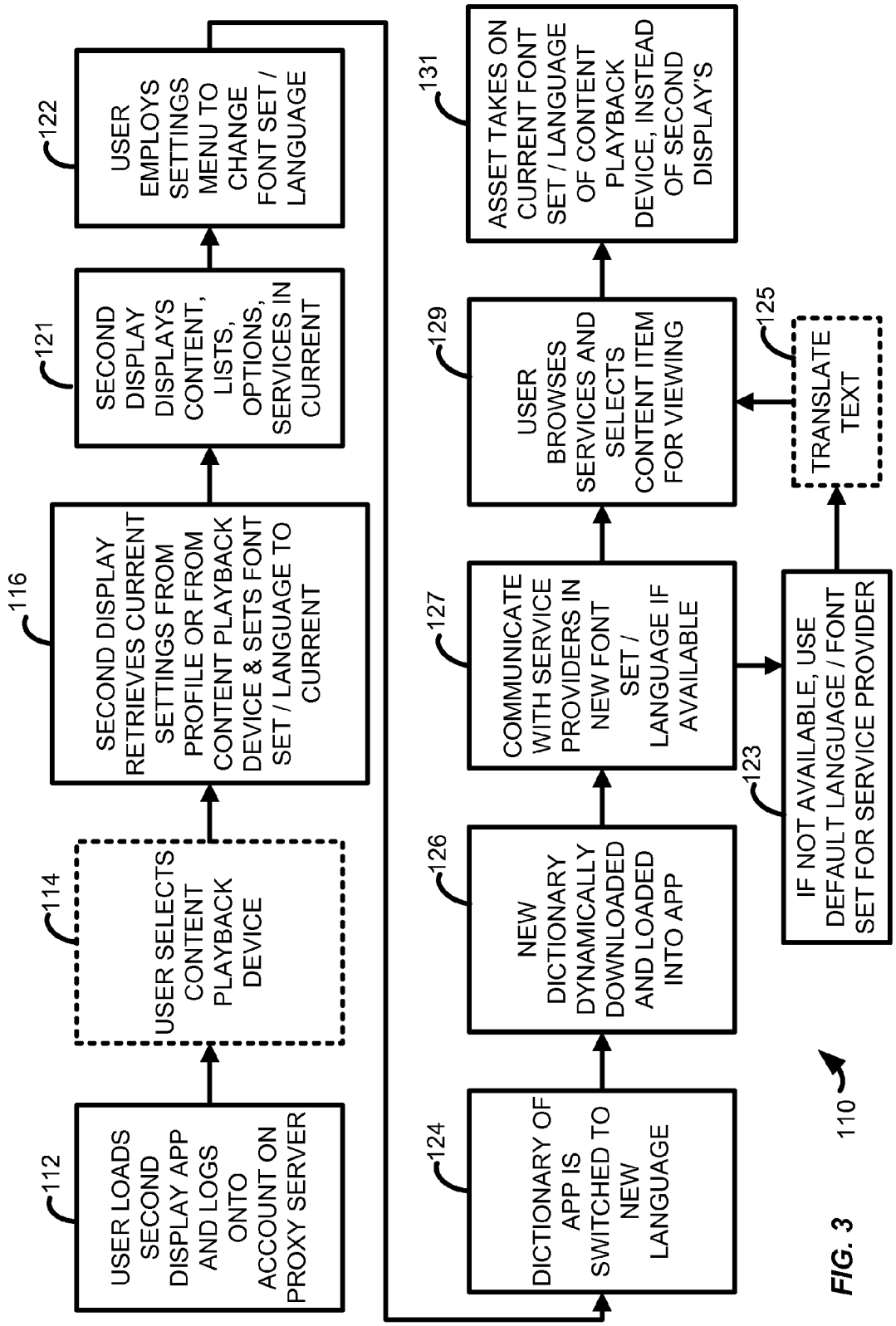
FIG. 3 is a flowchart illustrating an exemplary method according to the present principles.

FIG. 3 illustrates one exemplary method 110 by which a character font set, unsupported on a content playback device, may be used in the context of a second display to allow user browsing, searching, and content item selection to occur in a language and character font set desirable to a user. A first step in the method is that a user loads a web application into their second display and logs on to a user account on, e.g., a proxy server (step 112). A next step, which is optional, is that a user selects a content playback device (step 114). As described elsewhere, this step may be omitted where no content playback device is needed for browsing or where only one content playback device is affiliated with the user account. This step may also be omitted where such information is retrieved from a profile or via other methods described. A next step is that the second display retrieves current settings from a profile or from a content playback device (or elsewhere, e.g., from a storage cookie on the browser) and sets a character font set and language according to those current settings (step 116). In particular, the second display may retrieve a current character font set and language, desired by the user, from the profile. It is noted that in this sense a profile may include any memory or cache in which such data may be stored. The profile may also include not just a preferred language and character font set but also a preferred language and character font set per service provider. Such information may be useful where a user has more than one preferred language, but not all are supported by each service provider. The profile may include other information such as ratings or the like.

A next step is that the second display displays various options in that current character font set (step 121). For example, the second display may display a list of service providers or a list of available content items within a service provider or across several service providers.

A next step is that a user employs a menu or other such user interface, e.g., a settings menu, to change the character font set and language (step 122). Responsive to this, a dictionary of the web application is switched to the new language (step 124) and the character font set and new dictionary are dynamically downloaded and loaded for use into the web application (step 126). The user may communicate with the service providers in the new language and using the new character font set, if the same is supported by the service providers (step 127). For example, if the new character font set and language are Chinese, the user may directly type in Chinese characters in a search for movies or the like in a Chinese video content service or in a Chinese version of a video content service. If the new character font set is not available, then communications will occur using a default character font set for the service provider (step 123). However, as noted with element 127 of FIG. 1, a step may be employed in some systems of translating the text prior to display (step 125). In this step, an automatic translation may be performed of the text to be displayed prior to its rendering on the second display.

A user may then browse the available services and content items and select a content item for viewing (step 129). Of course, due to the limitations of the content playback device, the chosen content item or asset, when played back, adopts a supported character font set and language of the content playback device (step 131), which may incorporate a default character font set and language.

Aspects of various components are described below.

Figure 4:
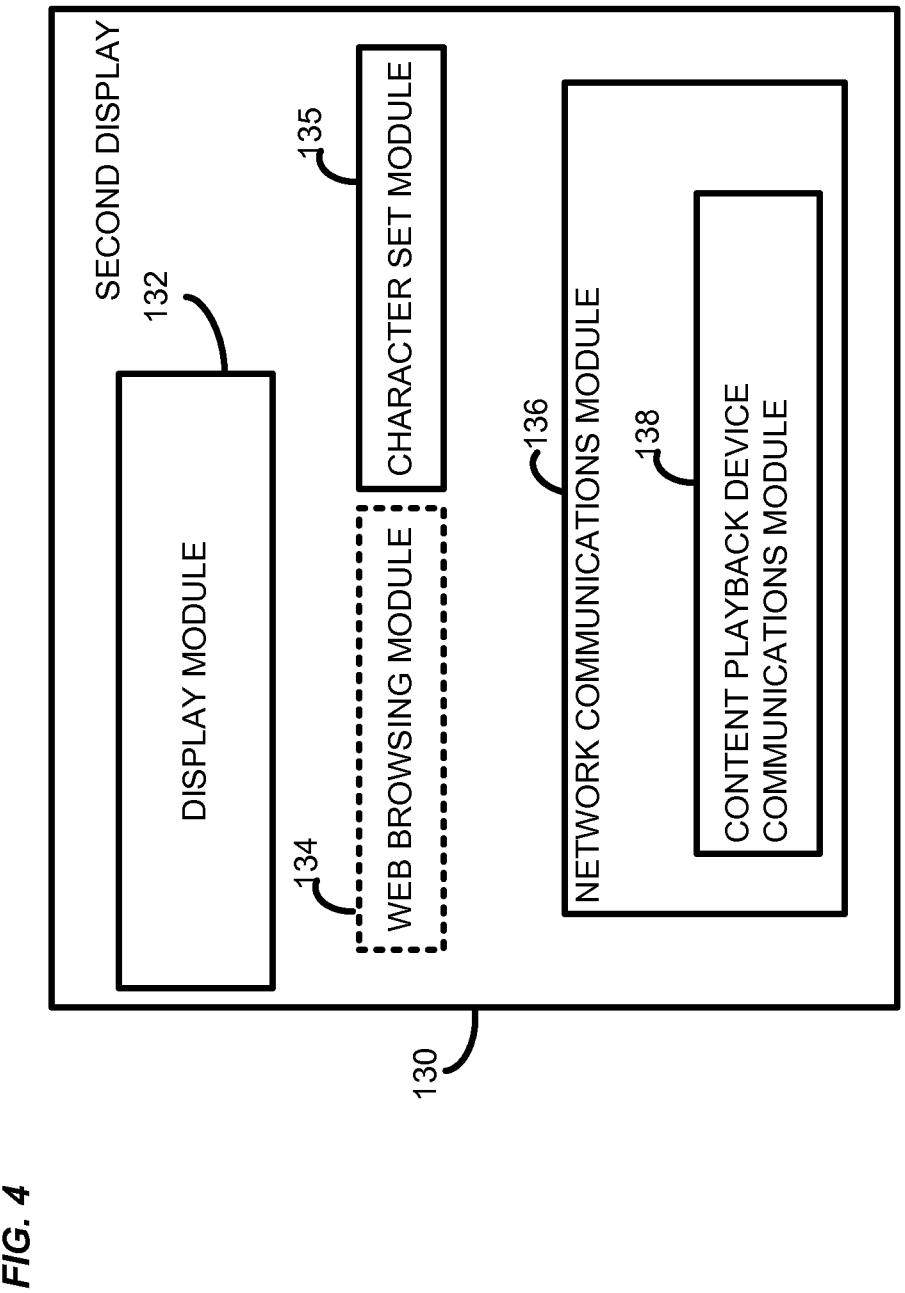
FIG. 4 is a block diagram of an exemplary second display system in accordance with the present principles.

FIG. 4 illustrates one implementation of a second display 130. The second display 130 includes a display module 132 for use in, among other aspects, browsing lists and selecting items related to the content playback device. For example, a list of content playback devices accessible to the local network and/or addressable by the second display may be displayed using the display module 132, and the user may choose a content playback device from among them. In addition to choosing a content playback device, or instead of, a user may review a list of accessible service providers using the display module 132. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 132 may display not just content accessible to the local network, but also content resident on the local network, such as content stored on a digital video recorder or Blu-ray® player.

Also within the second display 130 is an optional web-browsing module 134, through which the above-noted content items may be browsed in the case where the second display application is written in HTML and Javascript. A web-browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 134 may be replaced with a suitable other module allowing service and content selection or other such functionality.

The second display 130 also includes a module for network communications 136. The network communications module 136 allows the second display to communicate with the local network as well as, in some cases, specific devices directly. As part of the network communications module 136, a communications module 138 for communications with a content playback device is provided. The content playback device communications module 138 allows the second display to communicate with the content playback device either over the local network or directly. Such direct communications may include various types of wired or wireless transmission schemes, including Wi-Fi, USB, infrared, Bluetooth®, or the like. The second display 130 may further include a character font set module 135. The character font set module 135 may be controlled by the settings menu and may be employed to change the desired character font set and language displayed by the display module 132, and may further be employed to send a signal using the network communications module 136 to service providers to indicate a desired language and character font set in which the user desires communicate, if available. The second display may also include the translator module 27 in some implementations (see FIG. 1).

It is noted that the above modules may be implemented in hardware, non-transitory software, or a combination of the above. Typically, the same will be implemented within the context of a laptop computer, a tablet computer, a smart phone, or the like.

Figure 5:
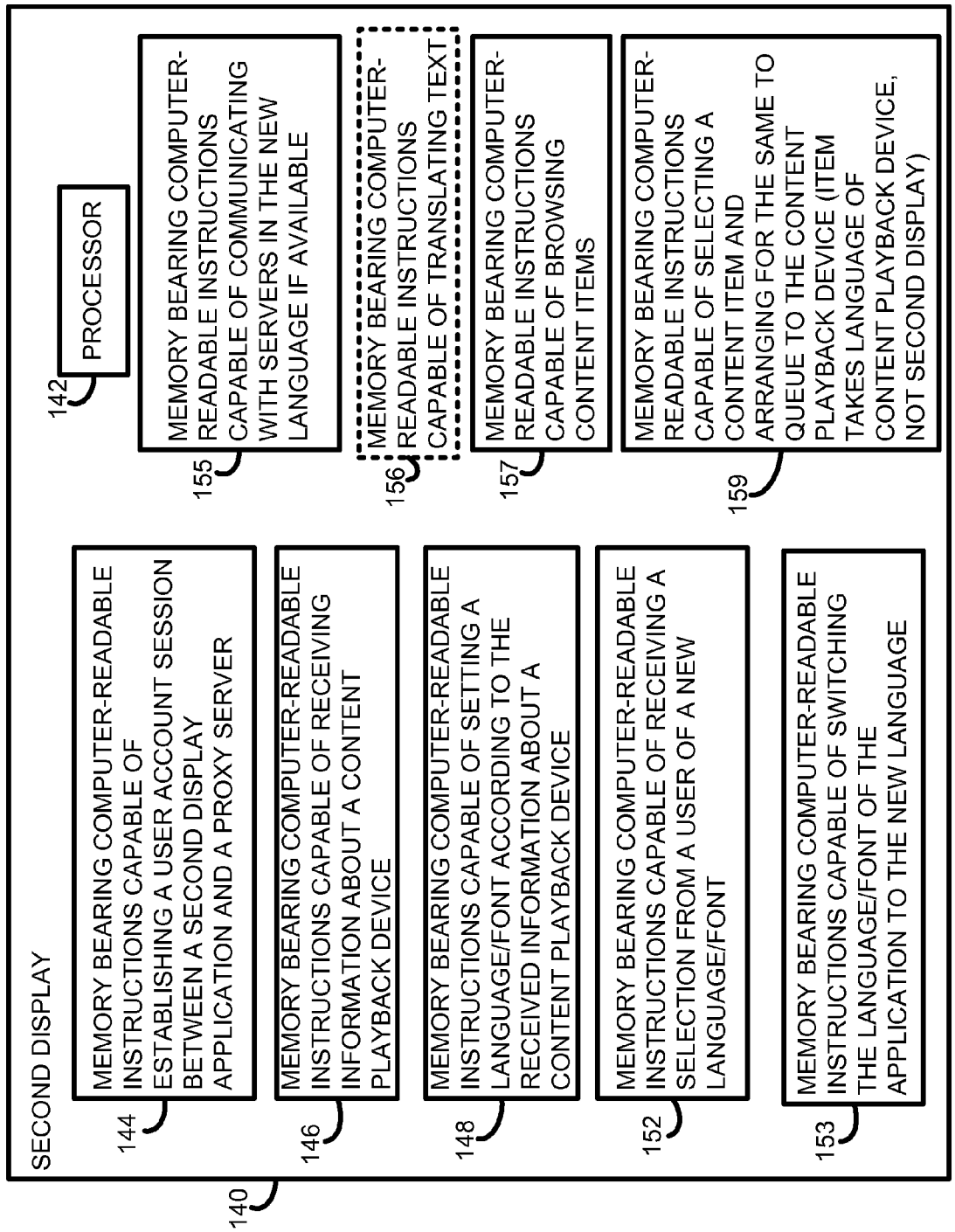
FIG. 5 is a block diagram of another exemplary second display system in accordance with the present principles.

Referring to FIG. 5, another implementation of a second display 140 is illustrated. In this implementation, the second display 140 includes a processor 142. The second display 140 further includes memory 144 bearing computer readable instructions capable of establishing a session between the second display and a proxy server, e.g., via a local network. The second display 140 further includes memory 146 bearing computer readable instructions capable of receiving information about a content playback device. This step may be omitted in some implementations, but the same may advantageously allow the proxy server to access certain service providers that require content playback device information and/or allow displayed lists of content items to be customized to the content playback device.

The second display 140 further includes memory 148 bearing computer readable instructions capable of setting a language and character font set according to the received information about a content playback device, if received. If no such information is received, the memory 148 may bear instructions that set the language according to values stored in a profile or via other methods as have been described. The second display 140 further includes memory 152 bearing computer readable instructions capable of receiving a selection from a user of a new language and/or character font set. The same may be provided in the form of a settings menu or other control in which the user may select a desired language. The second display 140 further includes memory 153 bearing computer readable instructions capable of switching the language and character font set of the web application to the new chosen language. The same may include downloading or accessing a new dictionary and/or character font set or the like. The second display 140 also includes memory 155 bearing computer readable instructions capable of communicating with servers, such as content service providers, in the new language, if the service provider support the new language and character font set. The second display 140 may further include memory 156 bearing computer readable instructions capable of translating the text that is to be displayed on the second display. As noted above, this is optional and may be situated in a number of locations in the system. The second display 140 further includes memory 157 bearing computer readable instructions capable of browsing or searching for content items, such as on a service provider. Second display 140 further includes memory 159 bearing computer readable instructions capable of selecting a content item so as to arrange for the content item to play in the content playback device or to be queued to play in the content playback device.

Figure 6:
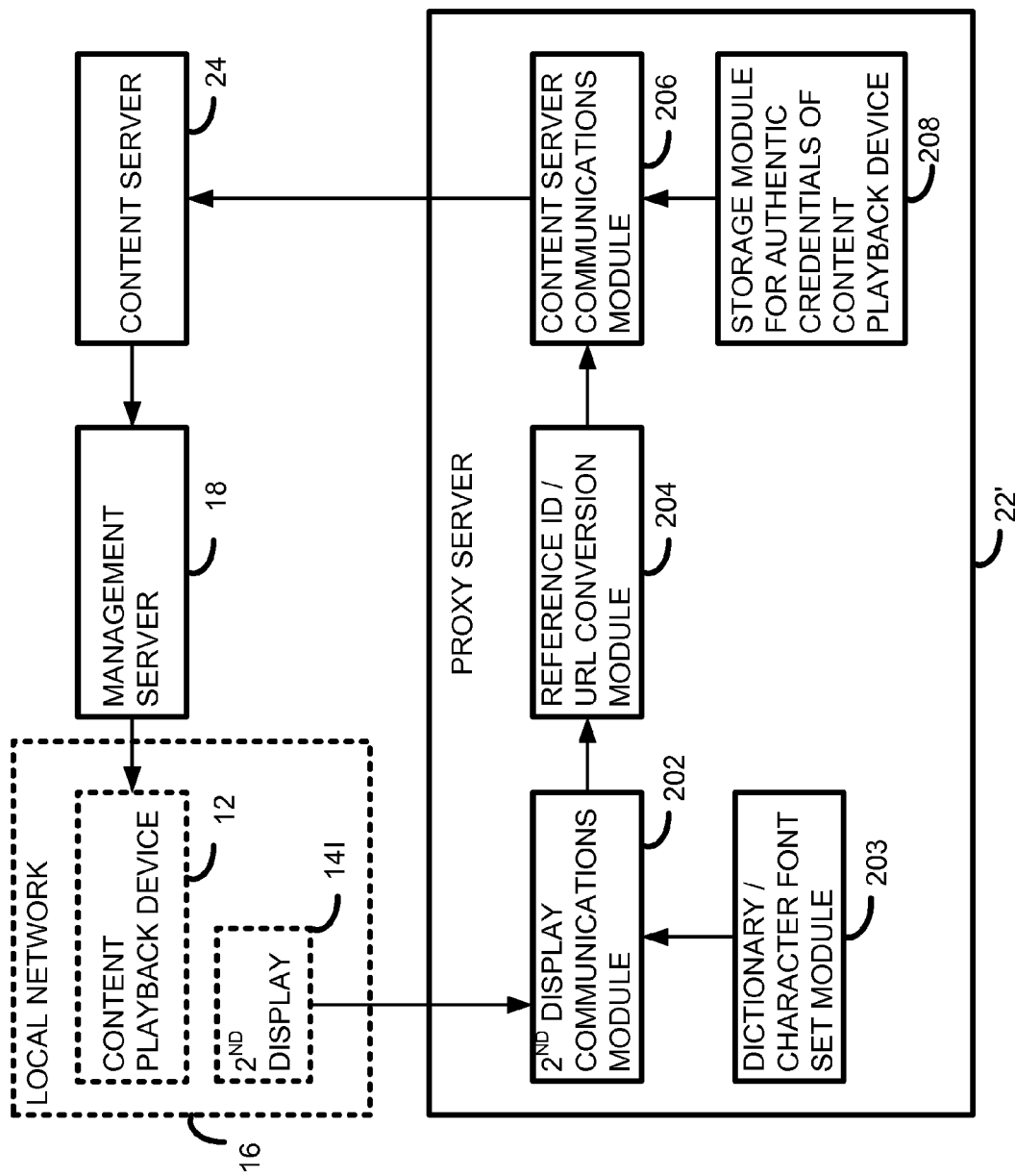
FIG. 6 is a block diagram of an exemplary proxy server in accordance with the present principles.

Referring to FIG. 6, details of a proxy server 22' are illustrated. The proxy server 22' includes a second display communications module 202 which performs communications with the second display 14i, e.g., to provide lists of content playback devices, service providers, content items, and the like. In turn, the proxy server 22' receives from the second display 14i selections of service providers, content playback devices, and content items associated with service providers. The proxy server 22' further includes a storage module 208 which stores, among other things, authentication credentials of content playback devices associated with the user account. The proxy server 22' also includes a content server communications module 206 which communicates with content servers 24 and/or with management servers 18 to arrange for selected content playback devices 12 to receive selected content items, or access to the same, as chosen by a user using the second display 14i. The proxy server 22' may further include a dictionary and character font set module 203 that is responsive to the second display communications module 202. Responsive to a user changing a desired character font set and language, the dictionary and character font set module 203 may download the desired and selected character font set and dictionary to the second display 14i. In some cases, these components may be already resident on the second display 14i, negating the need to download the same from the proxy server. It is also noted that the dictionary and character font set may be downloaded or accessed from locations besides the proxy server. Finally, the proxy server 22' includes a reference ID/URL conversion module 204, which takes a playlist ID or reference identifier of the selected content item and converts the same to a content URL that may be employed by a service provider to arrange for a selected content item to be accessible by a content playback device 12.

Figure 7:
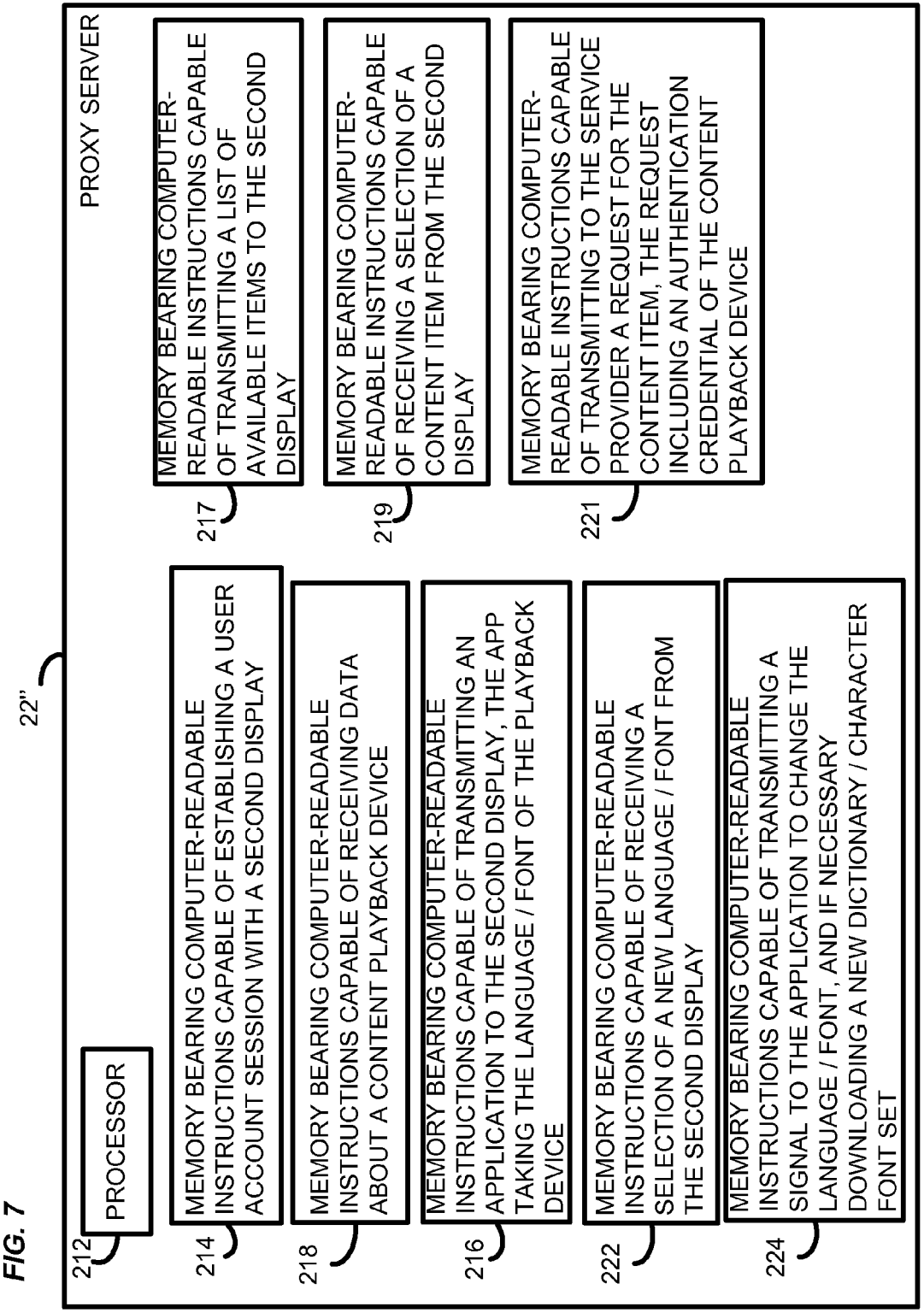
FIG. 7 is a block diagram of another exemplary proxy server in accordance with the present principles.

Referring to FIG. 7, another embodiment of a proxy server 22" is illustrated. The proxy server 22" includes a processor 212, which communicates with various memories to accomplish the principles described here. The proxy server 22" includes memory 214 bearing computer readable instructions capable of establishing a user account session with a second display, the user account associated with at least one content playback device. The proxy server 22" further includes memory 218 bearing computer readable instructions capable of receiving data about a content playback device associated with the user account. The proxy server 22" further includes memory 216 bearing computer readable instructions capable of transmitting a web application to the second display.

The proxy server 22" further includes memory 222 bearing computer readable instructions capable of receiving a selection of a new language and/or character font set from the second display. The proxy server 22" further includes memory 224 bearing computer readable instructions capable of transmitting a signal to the web application to change the language and/or font, and if necessary downloading a new dictionary and character font set. The proxy server 22 further includes memory 217 bearing computer readable instructions capable of transmitting a list of available items to the second display. These items are displayed in the newly selected language and character font set.

The proxy server 22" further includes memory 219 bearing computer readable instructions capable of receiving a selection of a content item from the second display. Finally, but without limitation, the proxy server 22" includes memory 221 bearing computer readable instructions capable of transmitting a request to a content server for playback of the selected content item on the content playback device, the request employing an authentication credential of the content playback device. This request may be transmitted through, e.g., a management server. The playback of the content item on the content playback device occurs using the character font set of the content playback device, e.g., a default character font set or one stored in a profile or other memory or cache associated with the content playback device.

Systems and methods have been disclosed that allow improvement of the user experience of the IPTV without adding to the hardware costs of the unit. As disclosed above, a web application on a second display may be used to browse network services in a language and character font set familiar to a user and which is not otherwise available on an associated content playback device. The system allows for significant user convenience, allowing users to browse, search for, and select content items using a desired language and character font set, outside the confines of those typically available on content playback devices.

Figure 8:
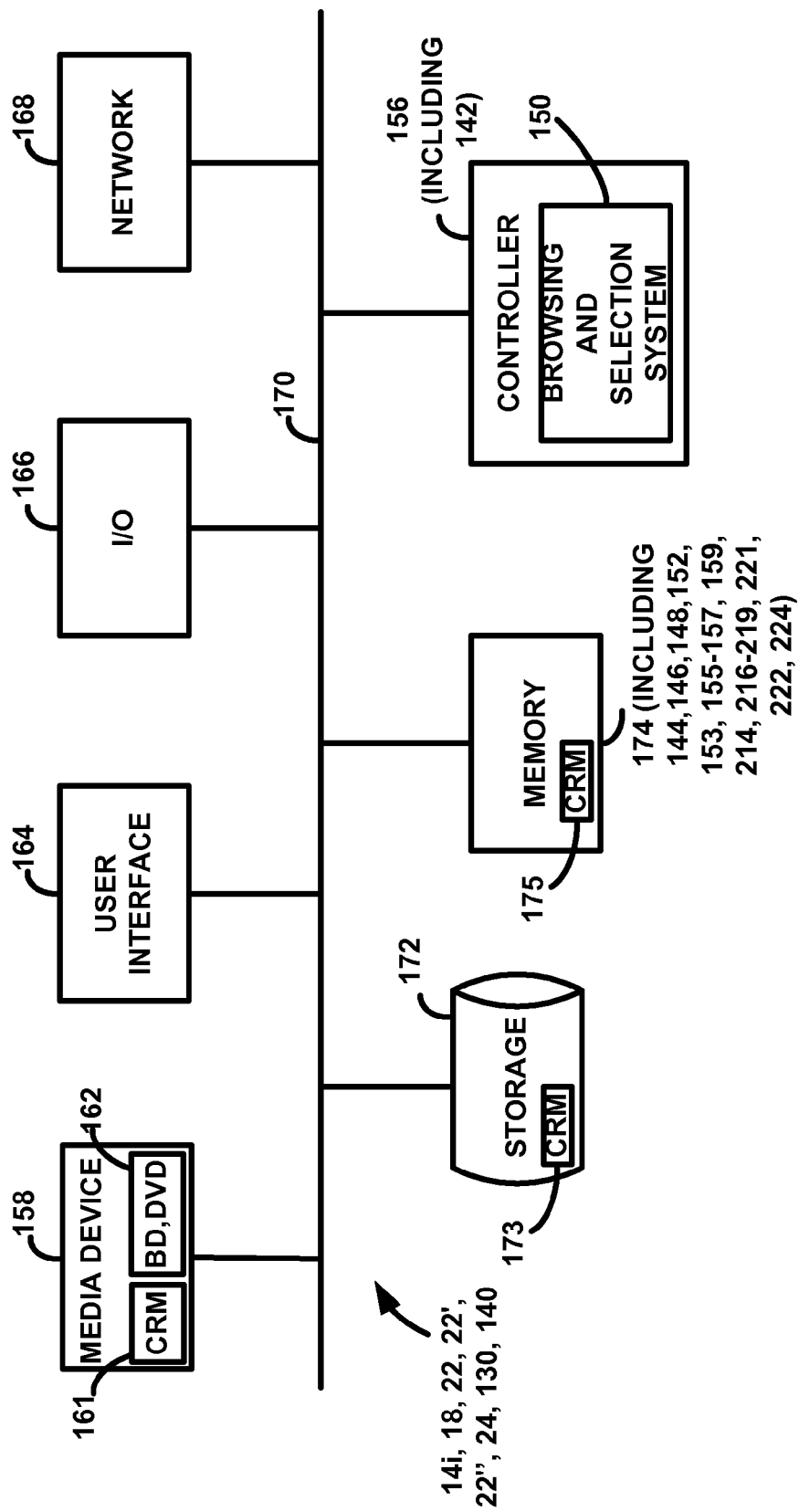
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, as well as for browsing. The second display functionality will be focused on here, but it will be understood that the various server functionality, e.g., that of the proxy server 22, management server 18, and content server 24, may also be accomplished with such components. Referring to FIG. 8, a representation of an exemplary computing environment for a second display 14i, 130, 140 is illustrated, e.g., a laptop, tablet, or smart phone. A user can employ the second display 14i to control a content playback device via the content, management, and/or proxy servers.

The second display 14i includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the second display 14i and its components for a browsing and selection system 150. The controller 156 loads instructions from the memory 174 or an embedded controller memory (not shown) and executes these instructions to control the system. In its execution, the controller 156 may provide the second display 14i control of a content playback device system 12 as, in part, a software system. Alternatively, this service can be implemented as separate modular components in the controller 156 or the second display 14i.

Memory 174, which may include non-transitory computer-readable memory 175, stores data temporarily for use by the other components of the second display 14i, and the same may include memories 144, 146, 148, 152, 153, 155-157, 159, 214, 216-219, 221, 222, and 224 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display 14i, such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the user content selections, from the user of the second display 14i and presenting information to the user, such as in the character font set described. In one implementation, the user interface 164 includes a keyboard, a mouse, audio speakers, and a display. The controller 156 uses input from the user to adjust the operation of the second display 14i.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet or "WiFi" interface (802.11). Numerous other types of network connections will be understood to be possible, including WiMax, 3G or 4G, 802.15 protocols, 802.16 protocols, satellite, Bluetooth®, or the like.

The second display 14i may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, while several implementations of the invention include that the user select a particular content playback device for playback, in some implementations a user may browse content with no content playback device selected at all. The user may also browse transactions like video rentals or home shopping purchases on the second display. The user may also request content items to be played back that are resident within the local network, e.g., content stored on a DVR or Blu-ray® player. While the system and method have described implementations in which content playback devices have been selected before browsing and where little or no reference to content playback devices is made, other variations are possible. For example, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application. Furthermore, the web application for the second display may be implemented as a native application rather than a web application, although the web application implementation may enjoy certain benefits such as enhanced portability.

In addition, while the description has focused on systems and methods where the user has changed a character font set from one character font set to another, it will be understood that the system and method are also applicable whenever a user is browsing a second display in a language and/or character font set different from that of the content playback device.

Accordingly, the present invention is not limited to only those implementations described above.

The invention claimed is:

1. A method of arranging a browsing session for content items for playback on a content playback device, comprising:
   i. establishing a user account session between the second display and a proxy server, the second display further in communication with at least one content playback and display device, wherein the establishing a session between a second display and a proxy server includes downloading an application from the proxy server to the second display, the application displaying text on the second display in a first language and character font set associated with a profile or with the content playback and display device;
   ii. receiving an input from a user, the input indicating a user selection of a second language, the second language having a corresponding character font set; and
   iii. changing the application to display text in the second language and character font set on the second display or, if the second language and character font set is not available, then in a default language and corresponding character font set, the default language and character font set associated with a service provider.

2. The method of claim 1, further comprising:
   i. receiving an input from a user, the input indicating a user selection of a content item from a service provider; and
   ii. causing the content playback and display device to request the content item from the service provider, wherein the content playback and display device requests the content item using an authentication credential, and wherein the content playback and display device plays back the content item using the first language and character font set.

3. The method of claim 2, further comprising displaying a list of content items on the second display, using the second language and character font set, and wherein the items on the list are generated at least in part using a device characteristic of the content playback and display device.

4. The method of claim 2, further comprising displaying a list of content items on the second display, using the second language and character font set, wherein the items on the list are generated at least in part using a list of content playback and display devices associated with the user account.

5. The method of claim 4, wherein the items on the list are generated at least in part using a list of service providers associated with the user account.

6. The method of claim 2, further comprising displaying a list of content playback and display devices associated with the user account, using the second language and character font set, and receiving a selection of which content playback and display device is to play back a selected content item.

7. The method of claim 2, wherein the causing the content playback and display device to request the content item includes causing the second display on which the selection was received to communicate the selection to the content playback and display device, for the content playback and display device to request the content item.

8. The method of claim 2, wherein the causing the content playback and display device to request the content item includes causing the second display on which the selection was received to communicate the selection to the proxy server on behalf of the content playback and display device.

9. The method of claim 2, wherein the receiving a selection of a content item includes receiving a selection of a content item at the proxy server, and wherein the receiving at least a portion of the selected content item includes receiving a content URL at the content playback and display device.

10. The method of claim 1, wherein the receiving an input from a user, the input indicating a user selection of a second language, includes determining if a second language has been previously selected by polling a user profile.

11. The method of claim 1, wherein the changing the application to display text in the second language and character font set or in a default language and character font set includes translating the text.

12. The method of claim 1, wherein the application is a web application.

13. A non-transitory computer-readable medium, comprising instructions for causing a computing device to implement the method of claim 1.

14. A computer program, stored on a non-transitory computer-readable medium, for causing a second display to perform the following steps, the second display associated with at least one content playback and display device:
   i. establish a session between a second display and a proxy server, the session associated with a user account on the proxy server;
   ii. receive data about at least one content playback and display device associated with the user account;
   iii. receive an application from the proxy server;

iv. execute the application, the application displaying text on the second display in a first language and character font set associated with the content playback and display device;

v. receive an input from a user, the input indicating a user selection of a second language, the second language having a corresponding character font set; and vi. change the application to display text on the second display in the second language and character font set or, if the second language and character font set is not available, then in a default language and character font set, the default language and character font set associated with a service provider.

15. The program of claim 14, wherein the second display is further caused to perform the following additional steps:

i. receive a list of available content items from the proxy server and display the list on the second display using the second character font set;

ii. receive a selection of one or more of the available content items; and iii. transmit one or more reference identifiers identifying the one or more respective content items to the proxy server, iv. such that the one or more reference identifiers are configured to be employed at the proxy server with an authentication credential of the content playback and display device to request from one or more respective service providers that the one or more content items be made accessible for playback on the content playback and display device, whereby such playback occurs using the first language and character font set.

16. The program of claim 14, wherein a plurality of second displays are associated with the at least one content playback and display device, and wherein each second display of the plurality is configured to display text using a respective user-selected language and character font set.

17. The program of claim 14, wherein the step of receiving data about at least one content playback and display device associated with the user account includes: receiving a selection from a user of one or a set of content playback and display devices associated with the user account, using a default content playback and display device, or using stored data about previously-used content playback and display devices.

18. The program of claim 14, wherein the second display is selected from the group consisting of: a laptop computer, a tablet computer, a desktop computer, an internet appliance, and a smart phone.

19. The program of claim 15, wherein the list of available content items includes a list of available service providers.

20. The program of claim 15, wherein the step of transmitting one or more reference identifiers identifying the one or more respective content items to the proxy server includes transmitting the reference identifiers directly to the content playback and display device whereby the content playback device transmits a request to a service provider using its authentication credential for the identified content items.

21. The program of claim 20, wherein the transmitting directly includes transmitting using a transmission scheme including: wired transmissions, wireless transmissions, infrared transmissions, Bluetooth® transmissions, or over a local network.

22. The program of claim 14, wherein the step of transmitting one or more reference identifiers identifying the one or more respective content items to the proxy server includes transmitting the reference identifiers to the proxy server on behalf of the content playback and display device.

23. The program of claim 14, wherein the receiving an input from a user, the input indicating a user selection of a second language, includes determining if a second language has been previously selected by polling a user profile.

24. The program of claim 14, wherein the changing the application to display text in the second language and character font set or in a default language and character font set includes translating the text.

25. A computer program, stored on a non-transitory computer-readable medium, for causing a proxy server to perform the following steps:

i. receive a request to establish a session with a second display, and upon proper user authentication establish a session with the second display, the session associated with a user account;

ii. receive data about at least one content playback and display device associated with the user account;

iii. transmit to the second display an application, the application allowing the second display to browse content offerings of a service provider using the proxy server, the application configured to display text in a first language and character font set associated with the content playback and display device;

iv. receive an input from the second display, the input indicating a user selection of a second language, the second language associated with a second character font set; and v. transmit a signal to change the application, such that the application displays text in the second language and character font set or, if the second language and character font set is not available, then in a default language and character font set, the default language and character font set associated with the service provider.

26. The program of claim 25, wherein the second display is further caused to perform the following additional steps:

i. transmit to the second display a list of available content items, the second display displaying the list of available content items using the second language and character font set or the default language and character font set;

ii. receive from the second display a selection of one or more content items for playback; and iii. transmit to the service provider a request for the one or more content items to be made available for playback on the content playback and display device, the request including an authentication credential of the content playback and display device, whereby the playback occurs on the content playback and display device using the first language and character font set.

27. The program of claim 25, wherein the step of receiving data about at least one content playback and display device associated with the user account includes: receiving a selection from a user of one or a set of content playback and display devices associated with the user account, using a default content playback and display device, or using stored data about previously-used content playback and display devices.

28. The program of claim 25, wherein the proxy server is further caused to perform the steps of:

i. transmit to the second display a list of available service providers;

ii. receive from the second display a selection of a first content item from one of the service providers;

iii. place the first content item in a queue;

iv. receive from the second display a selection of a second content item from another of the service providers;

v. place the second content item in a queue; and vi. upon playback of each queued content item, provide to the respective service provider a service provider credential, the service provider credential associated with the user account and with the selected service provider.

29. The program of claim 28, wherein the proxy server is further caused to perform the step of receiving from the second display a selection of one or more content items from the selected service provider for playback, and wherein the step of receiving from the second display a selection of one or more content items for playback includes receiving from the second display one or more respective reference identifiers identifying the one or more respective content items.

30. The program of claim 26, wherein the transmitted list is customized based on at least the data about the content playback and display device.

31. The program of claim 25, wherein the receiving an input from the second display, the input indicating a user selection of a second language, includes determining if a second language has been previously selected by polling a user profile.

32. The program of claim 26, further comprising translating the list of available content items, the second display displaying the list of available content items in the second language and character font set or in the default language and character font set.

\* \* \* \* \*